United States Patent [19]

Fells

[11] Patent Number: 5,462,250
[45] Date of Patent: Oct. 31, 1995

[54] BRAKE CALIPER TOOL

[76] Inventor: Cedric H. Fells, 1815 Garfield, Little Rock, Ark. 72204

[21] Appl. No.: 212,042

[22] Filed: Mar. 14, 1994

[51] Int. Cl.⁶ .................................................. A47B 91/00
[52] U.S. Cl. ...................... 248/371; 248/349.1; 248/499
[58] Field of Search ........................... 248/349, 371, 248/352, 499, 500, 505, 678, 680, 681, 183; 269/130, 131, 171

[56] References Cited

U.S. PATENT DOCUMENTS

| | | | |
|---|---|---|---|
| 2,269,946 | 1/1942 | Lange | 269/71 |
| 2,648,139 | 8/1953 | Wilkerson | 33/203 |
| 3,580,544 | 5/1971 | Payne | 254/131 |
| 3,693,965 | 9/1972 | Mitsengendler | 269/20 |
| 3,700,228 | 10/1972 | Peale | 269/61 |
| 4,367,572 | 1/1983 | Zielenski | 24/301 |
| 4,671,144 | 6/1987 | Zeller | 81/488 |
| 4,845,823 | 7/1989 | Shipman | 29/239 |
| 5,003,681 | 4/1991 | Schley | 29/239 |
| 5,077,886 | 1/1992 | Hashimoto et al. | 29/434 |

FOREIGN PATENT DOCUMENTS

| | | | |
|---|---|---|---|
| 241878 | 1/1987 | Germany . | |
| 474904 | 10/1952 | Italy | 248/349 |
| 76607 | 4/1950 | Norway | 248/129 |

*Primary Examiner*—Leslie A. Braun
*Assistant Examiner*—Catherine S. Collins
*Attorney, Agent, or Firm*—Richard C. Litman

[57] ABSTRACT

The present invention relates to a device instrumental for either tightening or loosening the threaded attachment of a brake caliper and a brake line. This device includes a rotatable surface upon which the brake caliper is secured. When the brake caliper is rotated in conjunction with the rotatable plate, it is either unscrewed from or screwed upon a threaded nut secured to the brake line. The device also includes a pair of legs for placing the rotatable plate proximate to the vehicle wheel. This accommodates brake calipers attached to brake lines having a modest length.

7 Claims, 4 Drawing Sheets

BRAKE CALIPER TOOL

BACKGROUND OF THE INVENTION

1. Field of the Invention

The present invention relates to a device utilized to either tighten or loosen the threaded connection of a brake caliper and a brake line, and more particularly to a device having a rotatable surface for supporting and rotating the brake caliper relative to the brake line.

2. Description of the Prior Art

Typically, a disc brake system is provided with a rotor and an associated caliper having at least two friction pads and pistons. The pistons engage the friction pads to force the pads against the rotor. The resulting contact between the friction pads and the rotor restrains rotation of the rotor, thus decreasing the speed of the vehicle.

After substantial repetitive use of the disc brake system, it is often necessary to do such maintenance work as change the friction pads, replace one or more of the pistons, or replace the entire caliper. To aid the mechanic in this work, many tools have been developed especially for brake system maintenance. A plurality of these tools have been for retracting the pistons into the caliper to facilitate replacement of the friction pads. With the pistons retracted inside the caliper, there is sufficient clearance for the worker to access and remove the friction pads.

Tools utilized for retracting a piston into a caliper are disclosed in U.S. Pat No. 3,580,544 issued to Arthur Albert Payne on May 25, 1971, U.S. Pat. No. 4,671,144 issued to Mark F. Zeller on Jun. 9, 1987, and U.S. Pat. No. 4,845,823 issued to Ernest E. Shipman on Jul. 11, 1989. The Payne patent teaches a tool for insertion between the piston and the disc such that rotation of the tool forces the tool face into the piston to force it to retract into the caliper, thus allowing the friction pads to be replaced. The Zeller patent relates to a generally U-shaped clamp for placement over part of the caliper housing. With this clamp in the appropriate location, the front walls of the clamp cover the pistons to prevent them from protruding outward from the caliper. The Shipman patent discloses a tool having a plurality of plier-like handles at one end and two caliper engaging surfaces at the other end. Displacement of the handles permits the caliper engaging surfaces to apply spreading forces to the brake pads which increase the distance between the pads while simultaneously forcing the associated caliper pistons to retract into the caliper.

Other tools utilized to increase the efficiency of maintenance work on disc brake systems are disclosed in U.S. Pat. No. 5,003,681 issued to Paul E. Schley on Apr. 2, 1991, U.S. Pat. No. 5,077,886 issued to Kenji Hashimoto et al. on Jan. 7, 1992, and German Pat. Specification No. 241,878 issued to Wilfried Muller et al. on Jan. 7, 1987. The Schley patent discloses a tool for rotating a brake piston. This tool includes a rim extending from and surrounding the working face of the tool. When the tool is placed over the face of the piston, the rim grips the piston which may then be rotated by rotating the tool. The Hashimoto et al. patent discloses an automated brake caliper mounting apparatus for inserting a brake disk into the gap between the friction pads of a caliper. This apparatus includes a working arm capable of carrying the caliper from a caliper supply station to a jig pallet where the brake disc is inserted into the caliper by the working arm. The Muller et al. patent specification shows a workpiece clamping assembly having several clamps for arrangement around the outer perimeter of the workpiece.

None of the above inventions and patents, taken either singly or in combination, is seen to describe the instant invention as claimed.

SUMMARY OF THE INVENTION

Typically, brake calipers are threadedly secured to brake lines. Therefore, to remove or install these calipers, the caliper must be rotated relative to the brake line. This is an extremely difficult task as brake calipers are often awkwardly shaped and extremely heavy, thus making them very difficult to maneuver. With the present invention, however, an individual worker can safely and efficiently detach a brake caliper from a brake line, or conversely, secure a brake caliper to a brake line.

This invention is a device having a housing supporting a rotatable plate. When removing a brake caliper from a brake line, the brake caliper is withdraw from the vehicle, and temporarily fastened upon the surface of the plate. As most brake lines are flexible, it should not be difficult to maneuver the brake caliper to engage the surface of the plate. However, if the brake line has a modest length or is not sufficiently flexible, the plate may be selectively tilted to achieve a more accessible configuration.

The fastening of the brake caliper upon the surface of the plate must be such that the threaded nut securing the brake line to the brake caliper is aligned with the axis of rotation of the plate. With this alignment, the worker can utilize a wrench or similar tool to secure the threaded nut while simultaneously rotating the brake caliper in conjunction with the plate. This rotation is continued until the brake caliper is removed from the threaded nut, thus separating the brake caliper from the brake line. To reattach the brake line to a brake caliper, the invention is utilized in the same manner as described above, with the rotation of the brake caliper being in the reversed direction.

Accordingly, it is a principal object of the invention to provide a novel brake caliper tool which enables an individual worker to safely and efficiently connect or disconnect the threaded attachment of a brake caliper and a brake line.

It is another object of the invention to provide a novel brake caliper tool having a rotatable plate for receiving and rotating a brake caliper.

It is a further object of the invention to provide a novel brake caliper tool wherein the brake caliper can readily be secured to the rotatable plate.

Still another object of the invention is to provide a novel brake caliper tool being selectively tiltable to facilitate engagement between the brake caliper and the rotatable plate.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
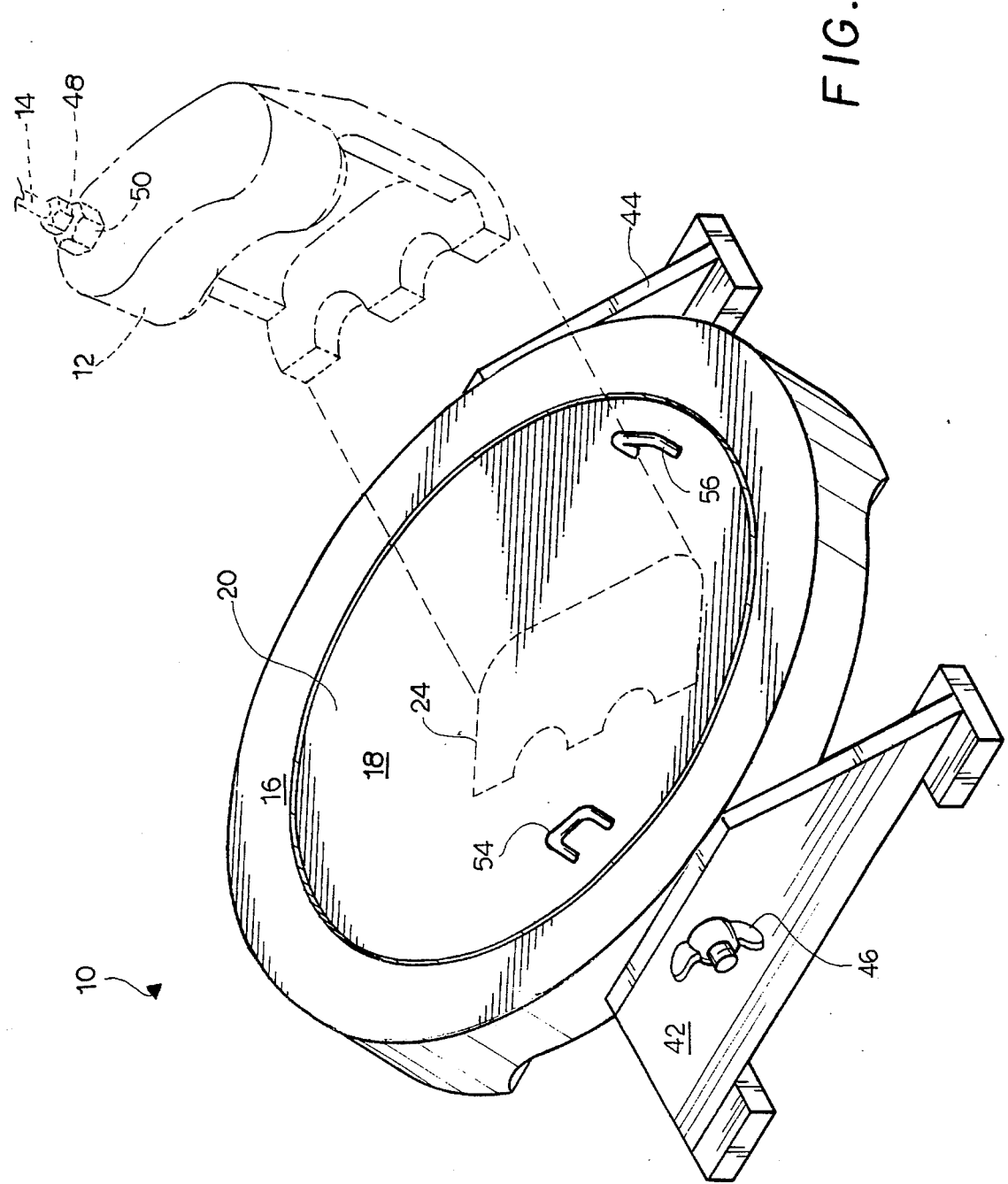
FIG. 1 is an environmental, partially exploded, perspective view of the present invention.

Referring now to FIG. 1, the present invention is a device 10 which enables an individual worker to safely and efficiently disconnect or connect the threaded attachment of a brake caliper 12 and a brake line 14. This is advantageous because brake calipers can be extremely heavy and awkward, making their manipulation exceedingly difficult. This is especially true when the brake caliper to be removed or installed is for a bus or other large vehicle.

The device 10 of this invention supports brake caliper 12 and allows it to be rotated in relation to brake line 14. Depending upon the direction of this rotation, the threaded connection between brake caliper 12 and brake line 14 can either be tightened or loosened, therefore allowing brake caliper 12 to be removed or installed, as desired. One advantage of this device 10 is that it minimizes the amount of time the worker must carry brake caliper 12, and thus consequently decreases the likelihood that brake caliper 12 will be dropped or otherwise mishandled. This diminishes the chance of injury to the worker as well as to brake caliper 12 and brake line 14.

Included in this device 10 is a housing 16 supporting a rotatable plate 18. This plate 18 has a first surface 20 for accepting brake caliper 12 and a second surface 22 for engaging housing 16. First surface 20 includes a marking 24 in the form of a brake caliper base, which shows the proper location of brake caliper 12 upon plate 18. If it is envisioned that device 10 will be successively utilized for differently sized brake calipers, marking 24 could be left off the first surface, or a plurality of varying sized markings could be placed thereon.

Figure 2:
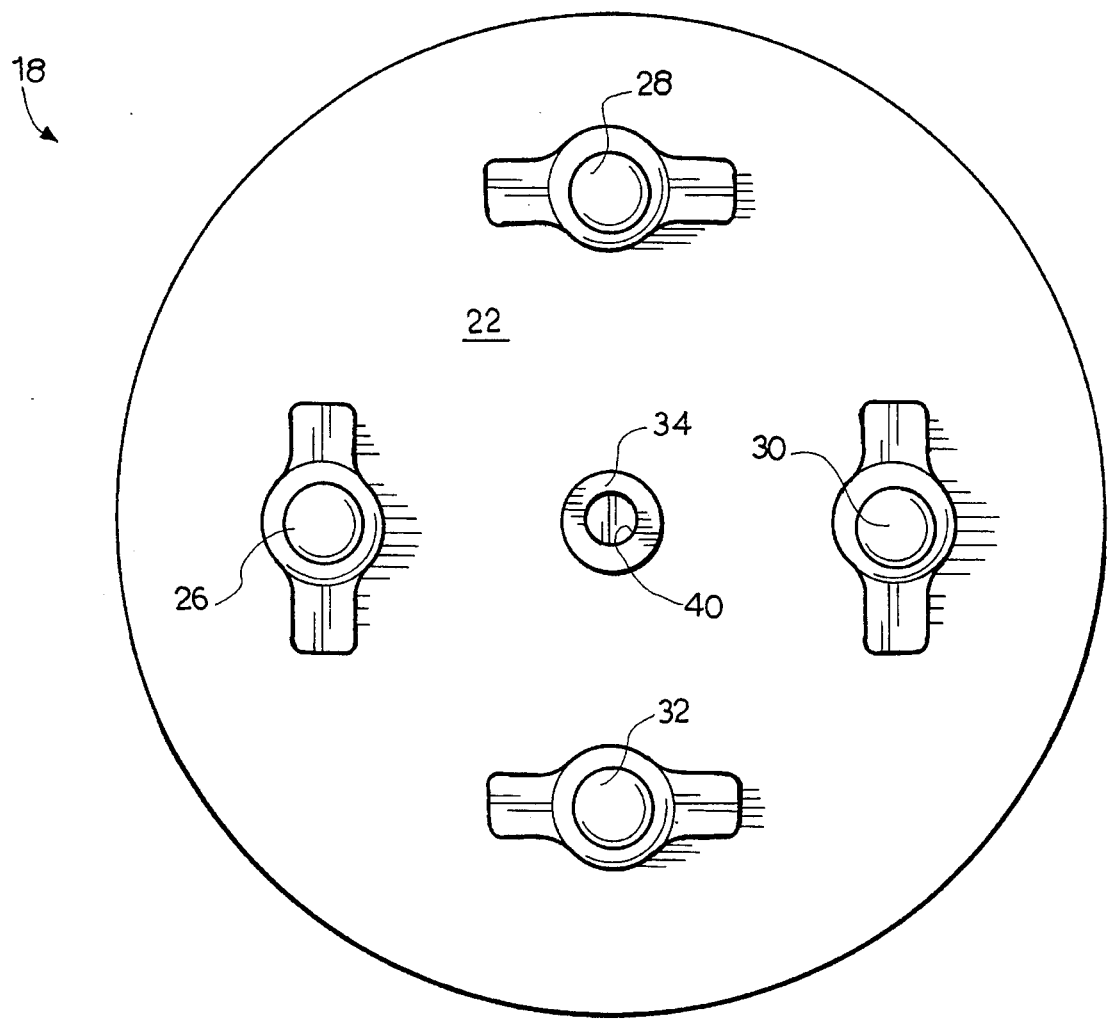
FIG. 2 is an enlarged scale, bottom view of the rotatable plate of FIG. 1.
Figure 3:
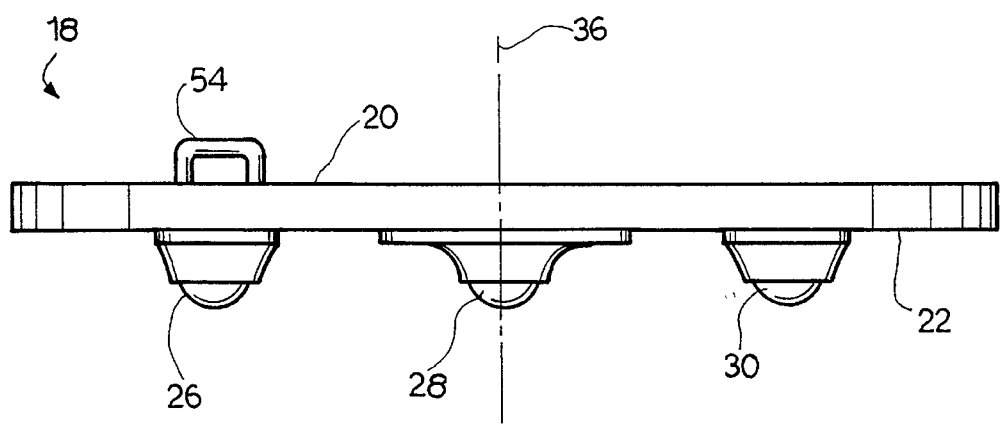
FIG. 3 is an enlarged scale, side elevational view of the rotatable plate of FIG. 1.
Figure 4:
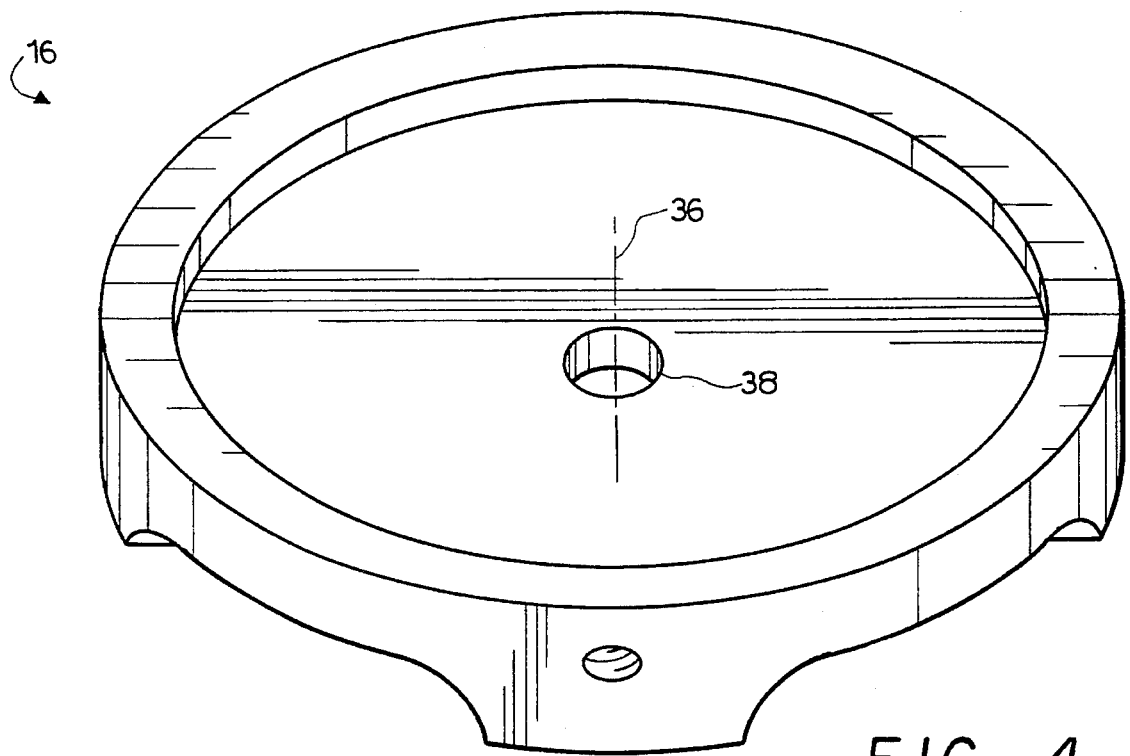
FIG. 4 is a perspective view of the housing of FIG. 1.

Plate 22 rotates upon four transfer bearings 26, 28, 30, 32 positioned between second surface 22 and housing 16. As shown in FIG. 2, these transfer bearings 26, 28, 30, 32 could be secured to second surface 22. However, if desired, these transfer bearings 26, 28, 30, 32 could be secured to housing 16. Second surface 22 also includes a shaft 34 extending along the axis of rotation 36 of plate 18. This shaft 34 is seen in FIGS. 2 and 3, and it is for placement within a bore 38, which is depicted in FIG. 4, and which extends completely through housing 16. When shaft 34 is placed within bore 38, a bolt having a washer can be threaded into aperture 40 to prevent plate 18 from detaching from housing 16. To increase the efficiency of rotation of plate 18, bearings could be arranged within bore 38 so as to surround shaft 34.

To facilitate attachment of brake caliper 12 to plate 18, the legs 42 and 44 raise plate 18 to a location proximate to the vehicle wheel area, where brake caliper 12 is located. Therefore, device 10 is capable of accepting brake calipers attached to brake lines having a modest length or a lack of sufficient flexibility. Legs 42 and 44 also allow housing 16 and plate 18 to tilt, thus further increasing the flexibility of device 10 to accept all brake calipers. Each leg 42 and 44 is secured to housing 16 by wing nuts 46 (not shown for leg 44), which secure the plate 18 and housing 16 at any degree of tilt.

If desired, device 10 could be utilized without legs 42 and 44, leaving housing 16 to rest directly upon the flooring surface or ground. This is shown in FIG. 5, and when utilized in this manner, device 10 is more portable than when it includes legs 42 and 44.

Figure 6:
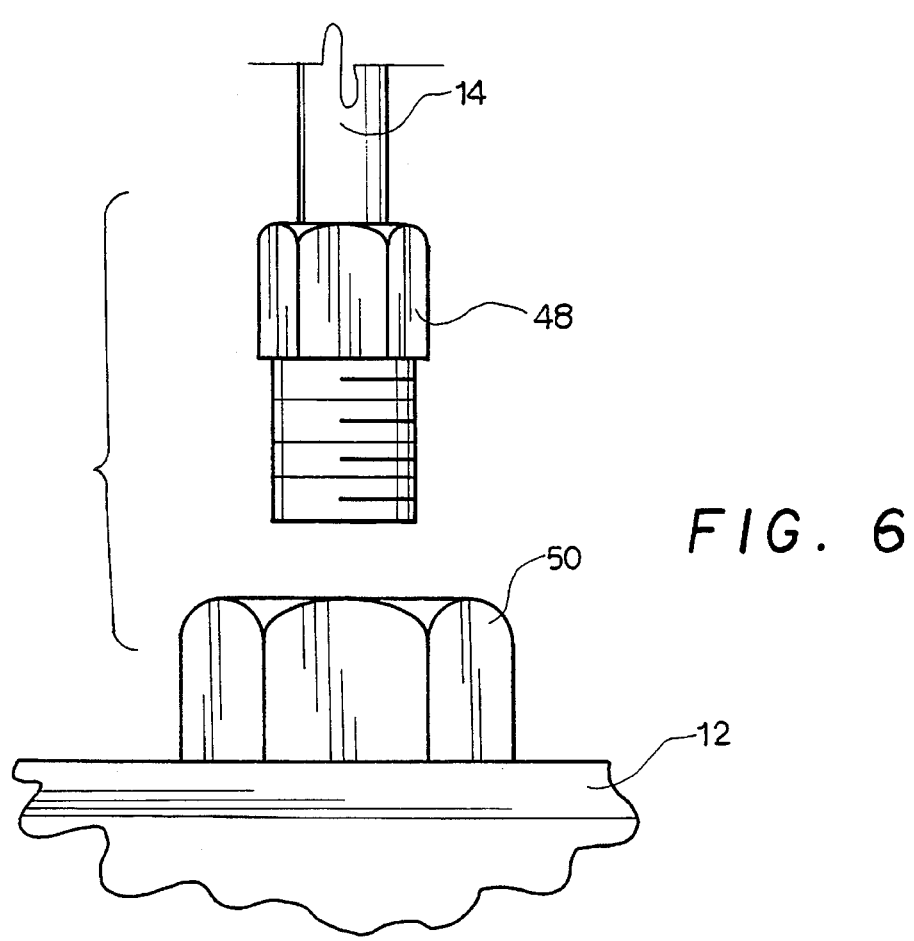
FIG. 6 is an exploded, enlarged scale, partial side elevational view of the connection of a brake caliper and a brake line.

The connection of brake caliper 12 to brake line 14 is accomplished at the threaded nut 48, which is secured to brake line 14, as shown in FIG. 6. As is readily seen, threaded nut 48 forms the male component of the connection while the threaded nut 50 of brake caliper 12 forms the female component. To either tighten or loosen brake caliper 12 upon this threaded nut 48, brake caliper 12 must be rotated relative to threaded nut 48. During this rotation, it is important that threaded nut 48 remain stationary, as each turn of this nut 48 results in a corresponding turn of brake line 14, which may result in damage to the line 14.

To either disconnect or connect the threaded attachment of brake caliper 12 and brake line 14, brake caliper 12 must be placed upon rotatable plate 18, at the location of marking 24 of FIG. 1. This placement aligns threaded nut 48 along the axis of rotation 36 of plate 18. With the threaded nut 48 aligned in this manner, brake caliper 12 can be appropriately rotated to either tighten or loosen its threaded connection to nut 48.

Figure 5:
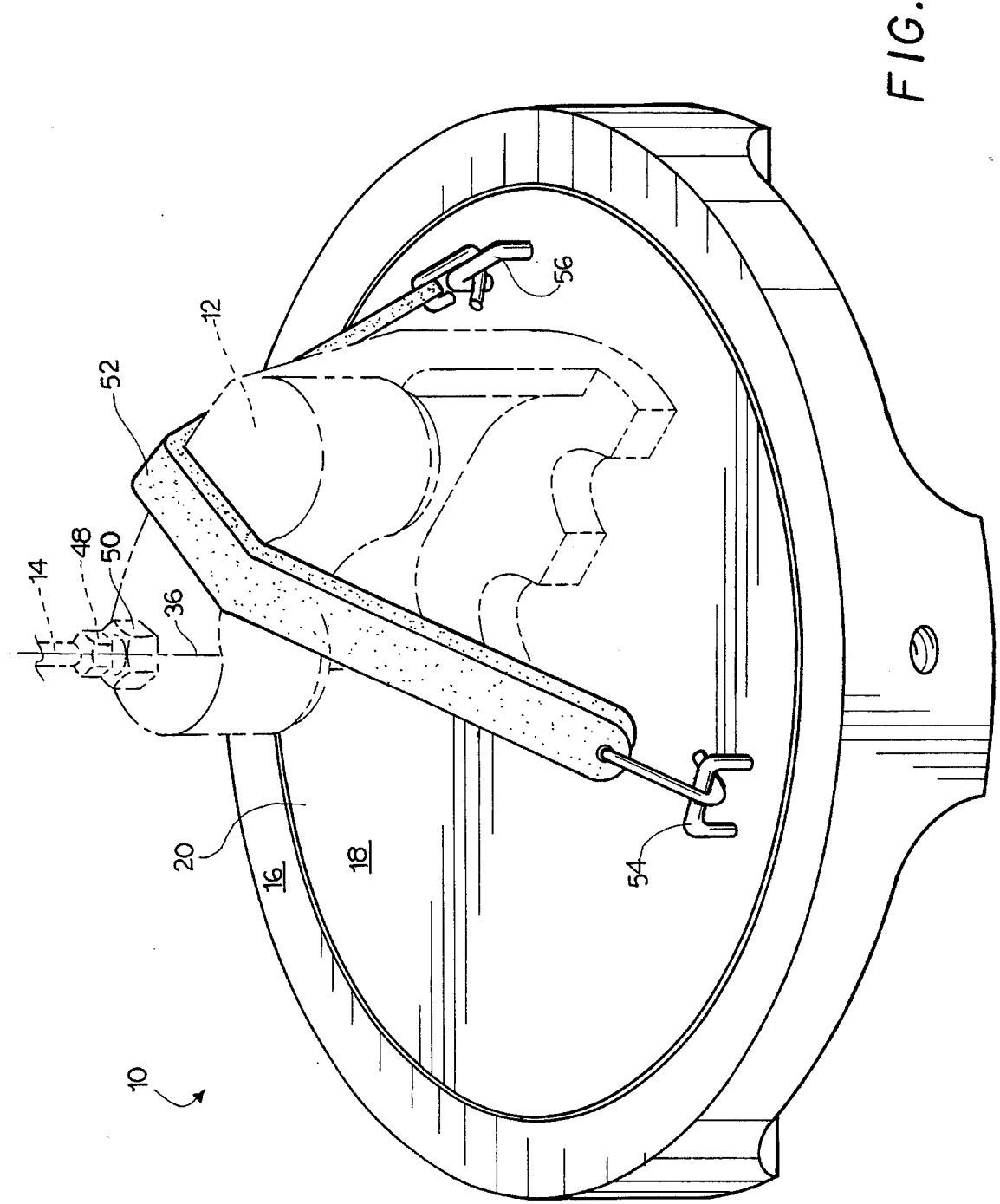
FIG. 5 is an environmental, perspective view of the rotatable plate and housing of FIG. 1.

Securing brake caliper 12 to plate 18 can be accomplished in any suitable manner, however, the method shown in FIG. 5 has proved to be both quick and effective. Here, a flexible strap 52 is draped over brake caliper 12 and secured to a pair of latches 54 and 56 protruding from the first surface 20 of plate 18. Each of these latches 54 and 56 are arranged upon surface 20 so as to be sufficiently spaced from each other to allow placement of brake caliper 12 therebetween. Additionally, the location of these latches 54 and 56 is such that strap 52 does not intersect axis of rotation 36, and therefore does not interfere with nut 48 while plate 18 is rotated.

After brake caliper 12 has been secured to plate 18, brake caliper 12 can be rotated while threaded nut 48 is held stationary by a standard wrench or other similar tool. One hand can be utilized to hold the wrench, while the other hand can be utilized to rotate brake caliper 12. In this manner, an individual worker can safely and efficiently remove or install brake caliper 12.

It is to be understood that the present invention is not limited to the sole embodiment described above, but encompasses any and all embodiments within the scope of the following claims.

I claim:

1. A device utilized for removing a brake caliper from a brake line, comprising:

a housing having a substantially circular recess portion and a bore therein;

a substantially circular plate supported within said circular recess portion of said housing, said plate being rotatable about an axis, and having a first surface and a second surface;

means for securing said housing and said plate together, said means for securing said housing and said plate together including a shaft provided on said second surface of said plate and extending along said axis of rotation of said plate for placement within said bore to facilitate rotation of said plate about said axis; and means for temporarily securing the brake caliper to said first surface of said plate, said means for temporarily securing comprising a pair of latches secured to said first surface, said pair of latches being sufficiently spaced from each other to allow placement of the brake caliper therebetween, and a cord for placement over the brake caliper, said cord being secured to each latch of said pair of latches when a brake caliper is being held by said means for temporarily securing for removing the brake caliper from the brake line.

2. The device according to claim 1, wherein said plate further comprises a plurality of ball bearings rotatably attached to said second surface of said plate.

3. The device according to claim 1, wherein said first surface of said plate further comprises markings for aligning the placement of the brake caliper.

4. A device utilized for removing a brake caliper from a brake line, comprising:

a housing having a substantially circular recess portion;

a substantially circular plate supported within said circular recess portion of said housing, said plate being rotatable about an axis, and having a first surface;

means for securing said housing and said plate together, said means for securing said housing and said plate together extending along the axis of rotation of said plate;

means for temporarily securing the brake caliper to said first surface of said plate, said means for temporarily securing the brake caliper to said first surface of said plate comprising;

a pair of latches secured to said first surface, said pair of latches being sufficiently spaced from each other to allow placement of the brake caliper therebetween, and a cord for placement over the brake caliper, said cord being secured to each latch of said pair of latches when a brake caliper is being held by said means for temporarily securing for removing the brake caliper from the brake line; and means for tilting said plate and said housing together relative to a support means, said means for tilting said plate and said housing comprising a pair of spaced supports attached to opposite sides of said housing whereby said housing with said plate is selectively tiltable with respect to said supports.

5. The device according to claim 4, wherein said first surface of said plate further comprises markings for aligning the placement of the brake caliper.

6. The device according to claim 4, wherein said plate further comprises a second surface having a plurality of ball bearings rotatably attached thereto.

7. The device according to claim 6, wherein said housing has a bore therein, and said means for securing said housing and said plate together comprises:

a shaft provided on said second surface of said plate and extending along said axis of rotation of said plate for placement within said bore to facilitate rotation of said plate about said axis of rotation of said plate.

\* \* \* \* \*